Oct. 7, 1947.  C. C. FARMER  2,428,452

RING TYPE CYLINDER AND PISTON

Filed Dec. 11, 1943

INVENTOR
Clyde C. Farmer
BY
ATTORNEY

Patented Oct. 7, 1947

2,428,452

UNITED STATES PATENT OFFICE 2,428,452

RING TYPE CYLINDER AND PISTON

Clyde C. Farmer, Pittsburgh, Pa., assignor to The Westinghouse Air Brake Company, Wilmerding, Pa., a corporation of Pennsylvania Application December 11, 1943, Serial No. 513,967

3 Claims. (Cl. 309—33)

1

My invention relates to pistons and piston packing rings suitable for use in fluid pressure cylinders of ring type which may serve as actuating or power means for braking means commonly designated disc or rotor type.

An object of my invention is to design an annular piston ring having a plurality of internal lubricant cavities communicating with lubricant means associated with the inner and outer peripheries of said piston.

My invention contemplates piston packing means of annular form which may be made from any suitable material such as rubber composition or neoprene and which will reduce to a minimum the escape of actuating fluid from the fluid pressure chamber.

An object of my invention is to design such a packing ring wherein means are afforded at the outer and inner circumference of the ring so that a tight seal is obtained between the packing ring and the ring-type cylinder when actuating fluid is injected into the pressure chamber.

A further object of my invention is to design such a packing ring wherein interlocking means are afforded on said ring and the associated piston for retaining said ring thereon.

Still another object of my invention is to design a packing ring adaptable to a ring cylinder wherein a minimum of dead air space is afforded between the cylinder and the piston therein.

A specific object of my invention is to design packing or sealing means adapted for use in a ring cylinder and comprising an annular wall with with inner and outer circumferential channels defined by annular flanges integrally formed with said wall and outwardly flaring sealing flanges merging with said annular flanges and forming therewith U sections whereby actuating fluid in said channels presses said sealing flanges into tight engagement with cylinder walls and said annular flanges into tight engagement with the associated piston.

In the drawings, Figure 1 is a fragmentary sectional view of one embodiment of my invention, the section being taken in a radial plane transversely of the ring cylinder.

2

Figure 1:
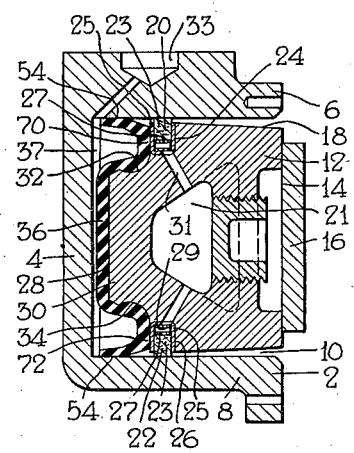

Describing my invention in greater detail and referring first to the preferred structure shown in Figures 1 to 5, inclusive, the cylinder 2 is of ring-type having an annular wall 4, an outer circumferential wall 6, and an inner circumferential wall 8 defining the annular cylinder chamber 10 having an inlet 33 for suitable actuating fluid. Operable within the cylinder chamber 10 may be a ring piston head 12 having secured to its outer face 14 an insulating member 16 which may abut associated braking means such as stators and rotors. The ring piston head 12 may be tapered as at 18 toward its outer face and is slidably movable within the cylinder chamber 10. Lubricating means generally designated 20 and 22 may be seated in annular recesses 24 and 26 formed respectively in the outer and inner circumferential surfaces of piston head 12. Each of the lubricating means 20 and 22 comprises an annular swab retainer 25, and contained therein is a swab 23 of felt or other suitable material, said swab being adapted for wiping engagement with the associated annular cylinder wall 6 or 8. The inner perimeter of the swab is provided with an expander ring 27 for engagement with a resilient swab expander 29 for maintaining the swab 23 in engagement with the adjacent cylinder wall, as above described. Lubricant cavities 21, 21 may be formed in piston head 12 at spaced intervals therearound and may be filled with oil soaked material to maintain lubricant in said lubricant means 20 and 22 through conduits 31, 31. The lubricant cavities 21, 21 are spaced apart and separated by solid ribs 41, 41, each rib being provided with a threaded opening 43 for the reception of a stud bolt or other convenient means for securing the insulating means 16 to the piston head. A flat annular pressure face 28 may be afforded on the inner annular rib 30 of said piston head and said rib 30 may be undercut or relieved as at 32 and 34 to afford interlocking means with my novel packing ring 36 as hereafter described. A fluid pressure chamber 37 is afforded between the packing ring 36 and the wall 4 of the ring cylinder.

Figure 2:
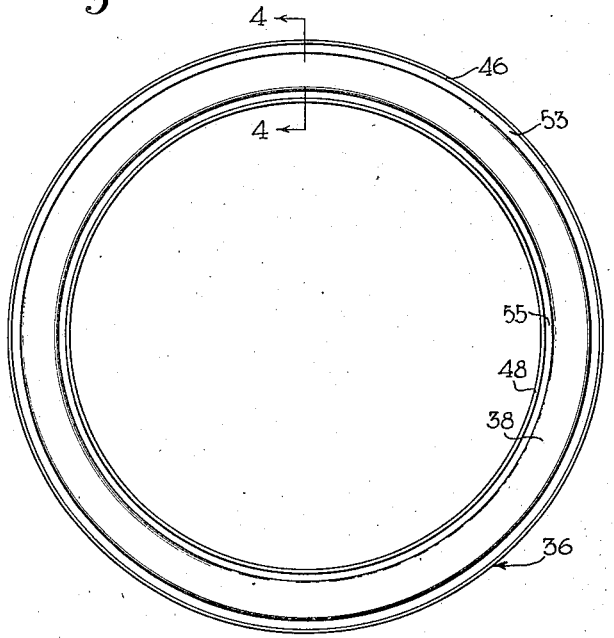
Figure 2 is an elevation of my novel packing ring shown in Figure 1.
Figure 3:
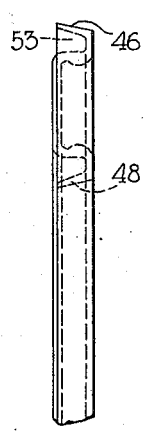
Figure 3 is an edge view thereof.
Figure 5:
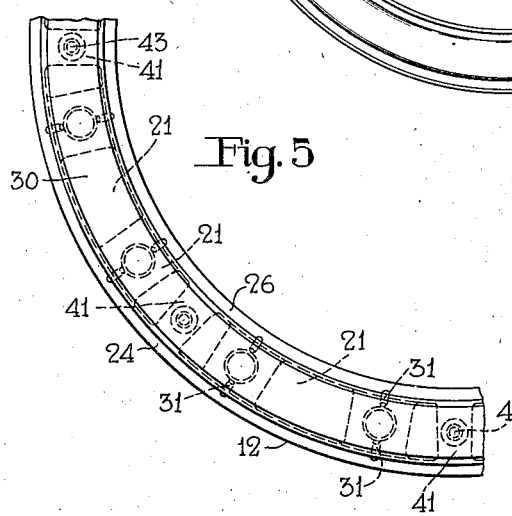
Figure 5 is a fragmentary side elevation of my novel piston, taken from the left as seen in Figure 1.
Figure 4:
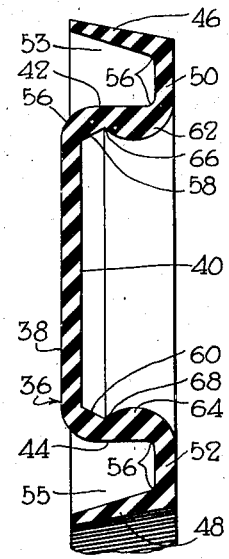
Figure 4 is a sectional view thereof taken substantially in a radial plane transversely of the ring as indicated by the line 4—4 of Figure 2.

The form of my novel packing ring, which may be made of any suitable flexible and resilient heat resistant material, is shown in detail in Figures 2, 3, and 4, and comprises an annular wall 38 of substantially uniform thickness with its inner surface 40 complementary to the pressure face 28 on the ring piston head 12. At the outer and inner circumferential edges of the annular wall 38 may be formed annular flanges 42 and 44 which merge with respective outer and inner circumferential sealing lips or flanges 46 and 48 through walls 50 and 52. The flanges 46 and 48 may be generally considered re-entrant flanges and form with the respective associated flanges and walls 42 and 50, and 44 and 52, sections of generally U-shape which define outer and inner circumferential annular channels or recesses 53 and 55 for the reception of actuating fluid.

The outer surfaces of the wall 38, the annular flanges 42 and 44, the sealing lips 46 and 48, and the walls 50 and 52 may merge along smooth radii as at 56, 56. The configuration of the inner surfaces of the packing ring may be complementary to the inner surfaces on the ring piston head 12 to afford a tight and accurate seat thereon. The inner surface 40 of the packing ring may merge with diagonally arranged surfaces 58 and 60 along smooth radii. On the inner surfaces of flanges 42 and 44 adjacent the walls 50 and 52 may be formed outer and inner annular beads 62 and 64 having arcuate surfaces merging with the walls 50 and 52 along smooth radii and merging with the diagonal surfaces 58 and 60 at relatively sharp corners as at 66 and 68.

It may be noted that before assembly the outer and inner circumferential sealing flanges 46 and 48 normally flare outwardly at an angle to the flanges 42 and 44. In assembly the sealing flanges 46 and 48 are forced inwardly under compression when inserted into the ring cylinder and have tight abutment as at 54 with the inner surfaces of the cylinder walls 6 and 8. The abutment at 54 and 56 reduces to a minimum the entrance of dirt and other matter into the pressure chamber 37.

In assembling the packing ring 36 and piston head 12, the packing ring may be forced over the annular rib 30 so that beads 62 and 64 are snapped into the complementary annular recesses 32 and 34 and thus interlock with the piston head to securely retain said ring thereon. The walls 50 and 52 may seat against the lubricant means 20 and 22 as at 70 and 72.

When actuating fluid is injected into the pressure chamber 37, the ring piston comprising packing 36 and head 12 is moved outwardly and the fluid pressure in the annular channels 53 and 55 further urges the sealing lips 46 and 48 into abutment with the walls of the ring cylinder thus affording a substantially perfect seal. It may be noted that the effect of placing the sealing flanges 46 and 48 under compression when assembled within the ring cylinder maintains the beads 62 and 64 in tight interlocking engagement with the piston head because the compressive forces are transmitted through the walls 50 and 52 and press the annular beads against the piston head in the complementary recesses 32 and 34. In operation the actuating fluid in the annular channels 53 and 55 further presses the beads 62 and 64 into tight engagement with the ring piston head so that the piston head and packing ring act as a unit. It will be apparent to those skilled in the art that I have designed a novel form of annular packing ring for ring-type fluid pressure cylinders in which dead air space between the piston and the cylinder is reduced to a minimum.

Figure 6:
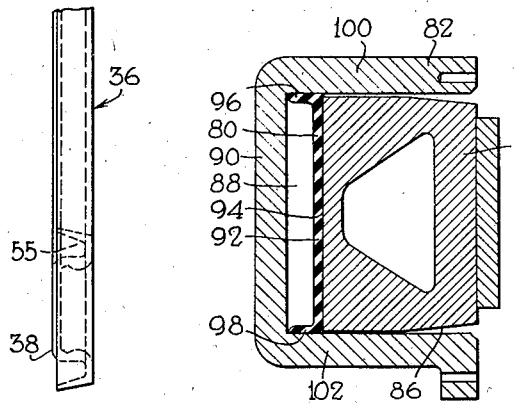
Figure 6 is a fragmentary sectional view of a modification of my invention, the section being taken substantially in a radial plane passing transversely through a ring cylinder embodying this modification.

Referring to the modification shown in Figure 6, the packing ring 80 is of simplified form as compared with that shown in Fig. 4 and above described. The ring cylinder 82 may be identical with that hereinbefore described and an annular piston head 84 operable therewith may be generally tapered as at 86 from its flat inner face toward its outer face. A fluid pressure chamber 88 may be afforded between the packing ring 80 and the annular wall 90 of the cylinder 82.

The packing ring 80 may be of flexible and resilient material and comprises an annular wall 92 of substantially uniform thickness seated against the inner flat face of the piston as at 94 and has outer and inner circumferential flanges 96 and 98 which normally flare outward. In assembly flanges 96 and 98 are compressed within the chamber 88 in tight abutment with the inner surfaces of the outer and inner circumferential walls 100 and 102 of the ring cylinder. As actuating fluid is injected into the chamber 88 the flanges 96 and 98 are further pressed against the inner surfaces of the walls 100 and 102 and the annular wall 92 of the ring is firmly pressed against the inner face of the piston head, thus affording a tight seal which substantially prevents escape of actuating fluid from the pressure chamber 88.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

Having now described my invention, what I claim as new and desire to secure by Letters Patent, is:

1. In a ring piston, a ring-like piston member comprising a plurality of walls cooperating to form within said member a plurality of spaced internal lubricant receptacles arranged in a circle concentric with said member, a plurality of lubricant means mounted in said piston about the inner and outer peripheries thereof, and means for delivering lubricant from said receptacles to said lubricant means.

2. In combination, a ring cylinder, a ring piston disposed to operate in said cylinder and having sliding sealing contact with both the inner and outer peripheral surfaces of said cylinder, said piston comprising a piston head having a plurality of walls cooperating to form within said head a plurality of separate and spaced apart lubricant carrying cavities arranged in a circle concentric with said head, and means providing for passage of lubricant from said cavities to said peripheral surfaces.

3. In combination, a ring cylinder, a ring piston disposed to operate in said cylinder and comprising an annular piston head and an annular packing having a low pressure face mounted against one end of said head and having parts in sealing and sliding contact with the inner and outer annular walls of said cylinder, annular lubricating means carried by said head in the inner and outer peripheral surfaces thereof having lubricating contact with the adjacent walls of said cylinder, said piston head comprising a plurality of walls cooperating to form within said head a plurality of separate and spaced apart internal lubricant carrying cavities arranged in a circle concentric with said head, and means opening said cavities to said lubricating means.

CLYDE C. FARMER.

REFERENCES CITED

The following references are of record in the file of this patent:

UNITED STATES PATENTS

| Number | Name | Date |
| --- | --- | --- |
| 2,204,807 | McCune et al. | June 18, 1940 |
| 1,579,409 | Smith | Apr. 6, 1926 |
| 2,218,616 | McCune | Oct. 22, 1940 |